United States Patent
Doten

(10) Patent No.: US 10,046,187 B2
(45) Date of Patent: Aug. 14, 2018

(54) WILDFIRE AERIAL FIGHTING SYSTEM UTILIZING LIDAR

(71) Applicant: Leonard E. Doten, Cold Springs, CA (US)

(72) Inventor: Leonard E. Doten, Cold Springs, CA (US)

(*) Notice: Subject to any disclaimer, the term of this patent is extended or adjusted under 35 U.S.C. 154(b) by 322 days.

(21) Appl. No.: 14/879,818

(22) Filed: Oct. 9, 2015

(65) Prior Publication Data
US 2017/0100615 A1 Apr. 13, 2017

(51) Int. Cl.
*G01S 17/08* (2006.01)
*A62C 3/02* (2006.01)

(52) U.S. Cl.
CPC ............ *A62C 3/0271* (2013.01); *G01S 17/08* (2013.01)

(58) Field of Classification Search
CPC . G06K 9/0063; G06K 9/03; G06K 2009/2045
See application file for complete search history.

(56) References Cited

U.S. PATENT DOCUMENTS

| | | | |
|---|---|---|---|
| 5,549,259 A | 8/1996 | Herlik | |
| 5,878,819 A | 3/1999 | Denoize | |
| 6,364,026 B1 | 4/2002 | Doshay | |
| 6,626,375 B1 | 9/2003 | Ireland | |
| 7,298,869 B1* | 11/2007 | Abernathy | G06K 9/0063 324/323 |
| 7,337,156 B2 | 2/2008 | Wippich | |
| 8,165,731 B2 | 4/2012 | Akcasu | |
| 2002/0026431 A1 | 2/2002 | Pedersen | |
| 2005/0139363 A1 | 6/2005 | Thomas | |
| 2006/0260826 A1 | 11/2006 | Hutter | |
| 2008/0319668 A1 | 12/2008 | Welty | |
| 2011/0137547 A1 | 6/2011 | Kwon | |
| 2012/0253740 A1* | 10/2012 | Rojas | G06Q 10/06 702/156 |
| 2014/0107927 A1 | 4/2014 | Rojas | |
| 2014/0163772 A1* | 6/2014 | Vian | G05D 1/0094 701/2 |

OTHER PUBLICATIONS

Akay et al.; Using LIDAR Technology in Forestry Activities; Environmental Monitoring and Assessment 151.1-4 (published 2009); pp. 117-125.

* cited by examiner

*Primary Examiner* — Luke D Ratcliffe
(74) *Attorney, Agent, or Firm* — Heisler & Associates

(57) ABSTRACT

A display provides optimized situational awareness to firefighting command personnel within a wildfire theater. Lidar scanning data provides a digital elevation map of the wildfire theater for the display. Geographic features such as lakes, roads, power lines and structures can be overlaid on the display. Lidar data utilizing multiple reflection signatures can be interpreted to represent fuel density and/or canopy height and such information can also be included upon the display. A burn area and active fire edge can be sensed by infrared scanner data and overlaid upon the display. The display can be utilized for input of firefighting command instructions, such as in the form of vectors or other annotations placed upon the display and correlated with airborne firefighting resources to be dropped at designated locations. Data provided to the display can be periodically updated to reflect the current situation. Firefighting resources are thus most effectively assigned.

26 Claims, 12 Drawing Sheets

WILDFIRE AERIAL FIGHTING SYSTEM UTILIZING LIDAR

FIELD OF THE INVENTION

The following invention relates to methods, tools and systems for providing situational awareness to command personnel engaged in wildfire fighting activities. More particularly, this invention relates to methods, tools and systems for gathering data within a wildfire theatre including terrain elevation data, terrain fuel density data, terrain canopy height data, terrain geographic feature data, wildfire location data including burn area and active front data and data on prior placements of firefighting agents and then presenting the data on a unified display which can also be optionally utilized for wildfire attack strategy and dispatching of firefighting resources, for maximum firefighting effectiveness.

BACKGROUND OF THE INVENTION

The destructiveness of wildfire to lives, property and the environment is often grave. Unlike some disasters which occur in an instant (e.g. earthquakes), leaving human resources best deployed merely to deal with the aftermath, wildfires, while occurring fairly rapidly, incur their devastation typically over a period of many days or weeks (sometimes months). Furthermore, while many natural disasters are of a type which can only largely be prepared for in advance (e.g. hurricanes, tornados, tsunamis and other extreme weather) and dealt with in the aftermath, wildfires can to a great extent be combatted to limit their destructiveness. Thus, significant opportunities exist to deploy firefighting resources in a rapid and effective manner to achieve goals of protection of life, property and the environment, as well as to extinguish the wildfire or at least limit the wildfire to relatively safe combustion of low value or low environmental sensitivity regions.

Existing firefighting resources include both ground and aerial firefighting resources. Ground resources can include bulldozers, firefighting teams with manual and powered hand tools, water tenders (distributing water or other firefighting agents) and a variety of human resource support personnel and vehicular assets to provide support for these ground resources.

Aerial firefighting resources include fixed wing and rotary wing aircraft. Fixed wing aircraft typically carry a firefighting agent loaded at a reloading base of operations, but also can carry water loaded at a main base area or scooped up from a lake or other body of water (with agents added to the water in some instances, such as with systems such as those described in U.S. Published Patent Application No. 2015/0231428 and U.S. Pat. No. 9,022,133, incorporated herein by reference in their entirety). The fixed wing resources fly over an area to be treated with water or firefighting agent and drop their payload of water or firefighting agent, either directly upon the active front of the fire or in a strategic manner along a "fire line" or other path to be established as a barrier against fire propagation therethrough. The water and/or firefighting agents can also be utilized for other tactical purposes such as to defend trapped victims, valuable structures or sensitive environmental areas from the advancing wildfire. Rotary wing aircraft typically include helicopters with a bucket suspended therebelow which can be dipped into a body of water, carried to an area where the firefighting strategy would benefit from its placement, and dumped upon the target area. It is known in at least one instance to enhance the effectiveness of such water drops by adding activated polymer gel to the water before dropping from the rotary wing aircraft, such as in the manner disclosed in U.S. Published Patent Application No. 2011/0203812, incorporated herein by reference in its entirety.

To coordinate these ground resources and aerial firefighting resources highly skilled individuals are organized within a command structure, to achieve the best possible outcome in fighting the wildfire. In many instances this organization structure includes an incident command system which includes an air tactical group supervisor (ATGS) under the supervision of an incident commander. Often the ATGS and/or related personnel are stationed in an aircraft (typically fixed wing) "orbiting" the wildfire theatre to both monitor the situation and direct the dispatch of firefighting resources. While this is a good vantage point, such personnel can be hampered in viewing the wildfire theatre in that smoke and/or clouds/haze can obscure sight, darkness diminishes visualization of the area, and some attributes of the area, such as combustible fuel density can be difficult to determine. Also, even with binoculars the ability to "zoom in" on particular sub-locations is limited.

Within the incident command system (ICS), the air tactical group supervisor (ATGS) is the one responsible for determining how and where drops are made from both fixed wing (FW) and rotary wing (RW) aircraft. These instructions may be general (for ongoing assignments) or specific (for a set number of drops). In larger incidents, subordinate ICS positions may also be filled dealing solely, for example, with the use of RW craft. ATGS generally operate at about 3,000' above ground level and on very large fires more than one may be used, each responsible for a different geographic area. ATGS are subordinate to incident commanders (ICs).

ICs are on scene, ground based and responsible for all assigned resources and operations among other functions. The largest portion of their work early in initial attack (IA) fires centers on accessing the situation, developing the initial strategy and tactics, and deploying ground resources (engines, water tenders, dozers and hand crews). The incident action plans (IAPs) are initially mental and developed frequently following typical patterns but in certain critical instances do not.

Firefighters are trained and expect to base decisions on less than complete information. The present fire status, expected future fire behavior and growth, potential unrecognized hazards, and threats to the environment, improvements and humans are only some of the areas that comprise the universe of information that is incompletely known and may be rapidly changing. Firefighters form what are essentially opinions but informed and useful ones to base their actions on. And they must also weigh their decisions in light of agency policies and direction, and societal and overall human values.

This system is intended to increase the amount, accuracy and selective dissemination of the information at hand. This applies to both in IA situations and when fire escapes require that the ICS organization be expanded to manage larger incidents requiring the sharing of increased amounts of information with an increasing number of people.

Beginning at the time of the first report, time constraints exist and a highly dynamic, chaotic event is occurring that requires a flexible and often evolving set of tactics to manage. The information must be timely, relevant, succinct and easily accessible in order to aid the decision making process.

In the early stages of IA fires, ATGSs develop their plans for the use aerial resources (and sometimes ground resources) to fit what they can visually observe and any information they receive from the ground. The size, movement and characteristics of the present fire, the deployment and actions of ground resources, the terrain and vegetation changes the fire may advance into, the expected arrival of additional resources are what chiefly can be quickly observed or known. The effect of any actions undertaken to that point in time is critical feedback affecting their next decisions as is any information on the IC's intentions.

This is a constant, ongoing process due to the chaotic, dynamic and variable nature of fire, and the effects of the changing environment on it. Weather in the form of wind is the most often unpredictable component and one that is not subject to small scale, accurate anticipation over time. There is no such thing as a weather forecast that provides sufficiently up to date, detailed information at this point due to the inability to measure initial conditions, only general trends can be known. Accordingly, a need exists for a system which more effectively provides situational awareness to firefighting command personnel and to improve the ability of command to manage and dispatch firefighting resources.

SUMMARY OF THE INVENTION

With this invention, a firefighting system is provided, especially for wildfire. The system includes a situational awareness display that is provided for the incident commander and/or other firefighting command personnel to visualize in realtime or near realtime a variety of information pertinent to the wildfire theatre. This situational awareness display includes both a display component which provides information to command personnel, and also (in embodiments of this invention) can be utilized in firefighting strategy development and in actual assignment of firefighting resources with appropriate instructions to implement firefighting strategy. The system (in certain embodiments) can assess impacts of previously assigned firefighting resources and incorporate them into the display for ongoing firefighting effectiveness.

The display includes as an underlying baseline lidar digital elevation map (DEM) data. Lidar data is typically gathered from a manned fixed wing aerial vehicle, but conceivably gathered from rotor wing vehicles, satellites, or other elevated platforms (e.g. five lookouts), which can be either manned or unmanned. As an example, simple lidar equipped unmanned rotary wing aircraft ("drones"), often with multiple propellers (e.g. "quad-copters," hexacopters, etc.) could be deployed in the field, and optionally tethered to a vehicle to ensure control over the vehicle. The drones would rise, such as to a predetermined altitude above the surface, and perform lidar scanning of the adjacent area. The lidar data produces a DEM precisely depicting the topography of the terrain within the wildfire theatre.

Various enhancements to this data display are contemplated for use individually or together according to this invention. One enhancement to this DEM is to add lidar derived combustible fuel/vegetation data. Lidar reflection data often includes multiple reflections from a single pulse due to the presence of vegetation upon the surface. A first reflection represents a top of a canopy of the vegetation. A last reflection of the pulse typically represents ground elevation. The lidar data can include this multiple reflection data so that canopy height data is taken from the first reflection and surface elevation data is taken from the last reflection. The differential between these two reflections can be calibrated to represent canopy height.

Canopy height and other details added to the DEM can be presented on the DEM in a variety of different ways. As one option, colors of varying shades can be provided to represent canopy height. As another alternative, shading of the map can follow a particular shading scheme to depict canopy height.

The lidar data can also be analyzed through analysis of multiple reflections provided thereby to provide an estimate of combustible fuel density. Combustible fuels in the path of a wildfire can make a significant impact on the speed at which the wildfire moves and the difficulty to be encountered in fighting the wildfire, as well as the propensity for the wildfire to "jump" past fire lines and other firefighting resources. Different types of vegetation and different heights of vegetation, as well as different densities of vegetation produce a pattern of multiple reflections of lidar laser pulses, referred to generally as a "signature."

While a first pulse generally represents a top of a canopy, and the last pulse generally represents ground, intermediate reflections of the laser pulse provide characteristics of the fuel upon the ground. In one method, the ratio of the ground reflection intensity to the sum of all other reflections' intensities (or some pertinent subset thereof) can be calculated and represent fuel density. In other methods and through controlled calibration of lidar data by first shining lidar data onto surfaces with known fuel densities and studying the multiple reflection signature provided for the different fuel densities, multiple reflection signatures can be correlated with different fuel types and fuel densities. With such calibration information being previously gathered, lidar can be utilized over new terrain and the multiple reflection signature gathered can be compared to this calibration data so that the multiple reflection lidar data can be correlated with fuel density and a fuel density indicator can be provided upon the DEM for each set of coordinates within the DEM. A combination of calculated fuel density (such as by the ratio of reflection intensities in the signature) and correlation to signatures of known prior fuel densities can also be used.

This fuel density can be depicted in the form of shades of a color, such as with a darker shade representing greater fuel density and a lighter shade representing lower fuel density. As an option, this fuel density data could be a two-dimensional (or more dimensions) data set which would include not only fuel density but also fuel type to the extent the multiple reflection data signatures can be effectively so correlated, such that different types of vegetation can be distinguished within the lidar data and displayed upon the DEM in an appropriate fashion. Such vegetation, canopy height, and fuel density data can be simultaneously added to the DEM or selectively added at the control of the commander (or other user). In this manner, a commander or other utilizer of the DEM has the option to view the characteristics of greatest interest to the individual at the time of viewing, or can choose to have multiple characteristics simultaneously viewed.

Other characteristics to be included in the DEM can include geographic features recognized by the lidar, such as lakes, roads, man-made structures, and other geographic features. Such geographic features could be interpreted from analysis of the lidar data, typically in an automated fashion, such as by particular lidar reflection signatures being correlated with man-made structures (for instance, a water tower would tend to have a distinctive structure which could be automatically recognized by the lidar reflection produced) and then the DEM can be labeled with such geographic features. As another alternative, preexisting map data for the coordinates comprising the wildfire theatre, such as the coordinates of roads passing through the wildfire theatre, can be overlaid onto the DEM. As at least one option, a user of the display can select whether to have prior map data overlaid onto the DEM or to have geographic features interpreted from the lidar data provided onto the DEM.

Furthermore, the DEM can have fire burn data added thereto. In one embodiment, fire burn data is gathered by an aerial vehicle or other suitable platform fitted with an infrared sensitive sensor which can correlate infrared heat signature with coordinates (e.g. GPS coordinates) within the wildfire theatre. As one alternative, lidar data can also be utilized to identify burn area (in that areas that have been burned will tend in many instances to have been flattened and removed of combustible fuels, such as providing only a single return rather than multiple returns to the laser pulse). The infrared and/or lidar data of the burn area can be added to the DEM, such as in the form of a unique color or unique shading depicting the burn area. As one option, the active burn area can be depicted at different shades of color to represent the hotness of the fire. As an alternative, an edge of the burn area which is the most active flaming front of the wildfire can be uniquely depicted, such as with an outlining line of a different color (e.g. red for the flaming front and black for lines depicting low or no heat difference at a burned out area edge.

The user of the display can selectively choose to have the wildfire data displayed on the DEM or not, such as to be able to study terrain details first, and then turn on active fire details upon the DEM display. The operator thus has a DEM display which clearly depicts geography, characteristics of the terrain including topography and fuel type, as well as location and intensity of the wildfire. This data is not gathered over a long period of time and assembled through painstaking processes which only make the data available after it has lost much of its "freshness" and hence lost much of its value, but rather are provided in real-time or near real-time for most complete situational awareness of the rapidly changing events surrounding the wildfire event within the wildfire theatre.

The data can be presented in a manner controlled by the user. For instance the user can "zoom in" or "zoom out" to adjust the area being viewed or pan/scroll through the data on the display to view areas of interest at the desired resolution. Layers of added data descried above can be turned on and off so the display shows only the layers of data desired. As one option, the display is in the form of "virtual reality" goggles worn by the user. The orientation of the user's head can in one such embodiment determine the portion of the wildfire theatre being displayed. Similarly, such virtual reality goggles can allow a user in one location to "see" a different location, such as from a camera mounted to an aircraft or other elevated platform. In such instances, a visual image (color, black and white, IR, etc.) could be provided as another layer of data for the DEM display, all coordinated to the same coordinates within the wildfire theatre.

While in one embodiment the DEM merely provides the status display including the features described above, and including or omitting various subparts thereof, most preferably the DEM is also configured for inputting of strategic and command instructions. In particular, the DEM is preferably presented upon a display which is capable of having inputs placed thereon by an operator. In one embodiment this display is a touchscreen display. In another embodiment a stylus can be used on the display. In perhaps a most preferred embodiment, a joystick is provided adjacent the display (or in the hand of the user) with a pointer or other icon visible on the display and representing an active point on the display with which the joystick is associated. The joystick is capable of two-dimensional motion to cause the pointer to move upon the display within the two dimensions of the display. The joystick or some other input would also typically have at least one button ("activation switch") which would allow for selecting of different locations on the display, in a similar manner to "left clicking" a mouse button. With such a joystick, stylus or finger touch on the screen, an operator can select locations and draw lines or other geometric shapes upon the display.

As one example, an operator can touch the display and then move a direction away from the initial touch point. The display would have a vector drawn on the display which would have a tail at the origin point where the display was first touched or otherwise selected, and would have a heading matching a direction extending away from this origin point and be drawn as a vector extending with a tail at the origin point and a head of the vector pointing in the direction of the heading. An operator could, before or after drawing such a vector, select a firefighting resource to be applied along this vector/line. For instance, firefighting resources including a fixed wing firefighting agent drop, a rotary wing firefighting agent drop, or a bulldozer line or hand crew line could be assigned to application along the line.

In one embodiment, selection of the resource would also have a known firefighting agent capacity of the resource and hence a maximum line length for the agent placed by the resource. The display could be controlled so that the length of the vector would be limited to the payload of the resource that has been selected. An operator can then rapidly determine how many "drops" will be required to provide an overall line of desired length. In one embodiment, the line is provided by striping with activated polymer gel emulsion and water from an aerial vehicle such as a rotary wing vehicle. Such polymer gel can be provided with an ultraviolet luminescent additive therein so that after placement of the firefighting agent, later ultraviolet imaging equipment can establish where the firefighting agent has actually been placed. In such a manner, later updates to the DEM can include prior placements of firefighting agents to minimize errors associated with retreating areas because they were not previously known to have been treated.

After the display has been annotated with vectors or other indicators representative of desired deployment of firefighting resources, an operator of the display in an appropriate command capacity can convert the display vector or other indicia into actual command instructions, in at least some embodiments. In one embodiment, merely selecting a firefighting resource to act upon the vector is provided with an origin location and heading which is to be flown by an appropriate resource to deposit the desired firefighting agent along the selected line. Typically, a human pilot would receive this assignment instruction in the form of a location and heading extending away from the drop location and would then fly the aircraft to the desired location for application of the firefighting agent. In one embodiment the control of the aerial vehicle on final approach can be controlled, such as through an autopilot programmed with the coordinates, to execute the firefighting agent placement in a precise manner according to the instructions of the commander, with the pilot merely controlling altitude to ensure safe placement, and being in a position to override the autopilot if its instructions seem in the field to be inappropriate. As a further alternative, the aerial vehicle could be piloted remotely or piloted by following of coordinates in an autonomous fashion. Such autonomous flying aircraft guided by coordinates would have the benefit of being able to fly in zero or low visibility conditions, as is often the case with smoke obscuring a wildfire theatre, or could fly in dense "swarms" of aircraft, optionally with automated collision avoidance programming, and without the risk of losing aircraft pilots or other flight personnel.

OBJECTS OF THE INVENTION

Accordingly, a primary object of the present invention is to expand and improve the analysis of active wildland fires and the control of airborne firefighting resources and other firefighting resources through a useful realtime display of relevant information relating to the wildfire theatre.

Another object of the present invention is to provide a display which augments human eyesight, memory and information processing abilities in realtime or near realtime to give human decision makers the best data available for wildfire decision making.

Another object of the present invention is to provide a display which utilizes lidar data for terrain characteristic mapping, including elevation and vegetation/fuel characteristics within the wildfire theatre.

Another object of the present invention is to provide a display which combines wildfire theatre elevation, vegetation and fuel density data with active burning wildfire data to more fully depict to command personnel where a wildfire is burning, and what terrain conditions exist surrounding the active burn area, to support effective firefighting decisions.

Another object of the present invention is to provide enhanced situational awareness to firefighting command personnel through a display formed primarily of relevant realtime gathered data.

Another object of the present invention is to provide a display upon which firefighting tactics can be proposed, planned and implemented, for rapid and effective firefighting tactical execution and assignment of firefighting resources.

Other further objects of the present invention will become apparent from a careful reading of the included drawing figures, the claims and detailed description of the invention.

DESCRIPTION OF THE PREFERRED EMBODIMENT

Figure 1:
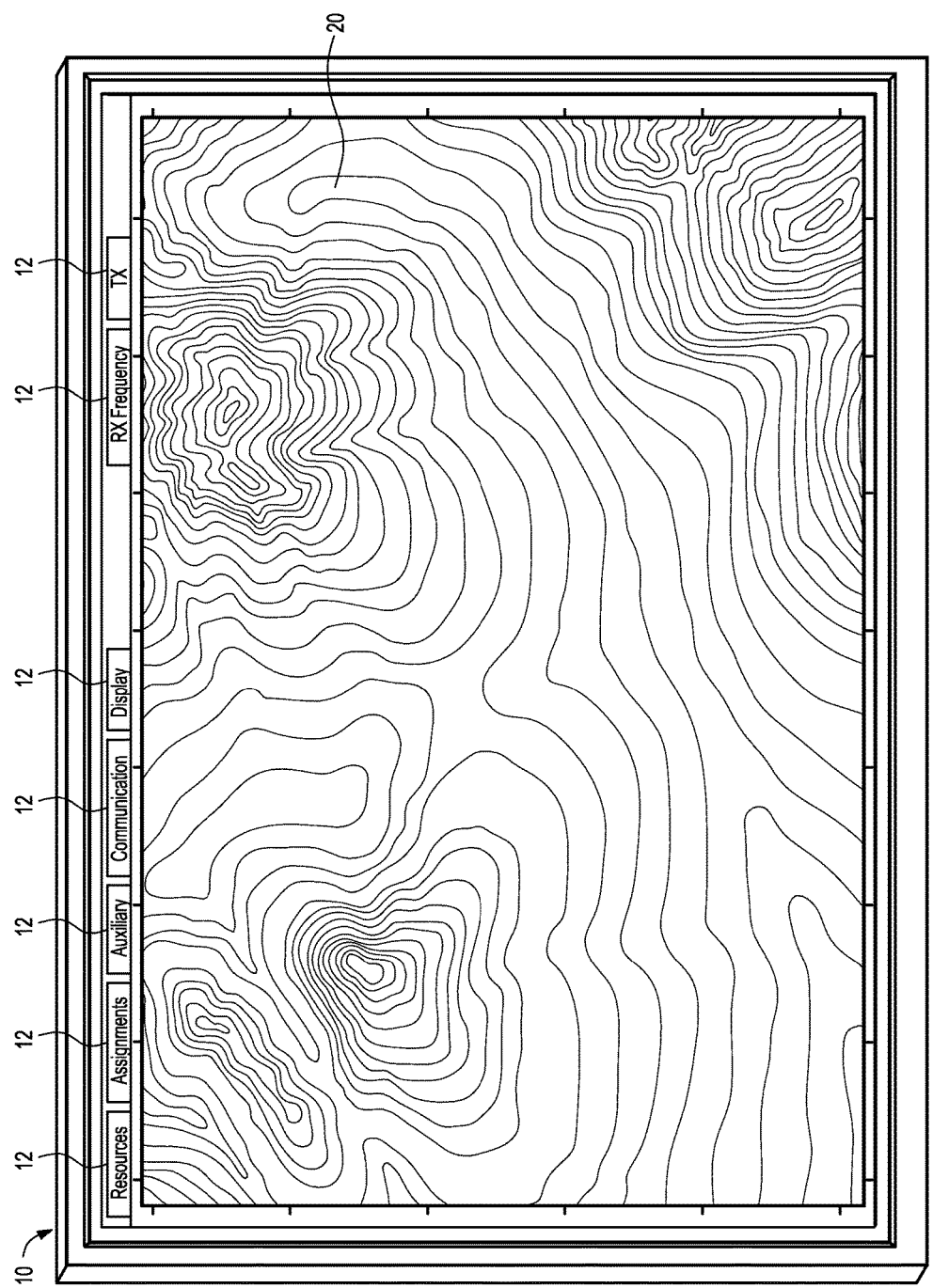
FIG. 1 is a top plan view of a digital elevation map presented upon a display for use by a commander or other personnel in fighting a wildfire.

Referring to the drawings, wherein like reference numerals represent like parts throughout the various drawing figures, reference numeral 10 is directed to a display of digital elevation map DEM data and data pertinent to situational awareness for firefighting command personnel within a wildfire theatre. The display 10 is under the control of an operator to display more or less information as is available and useful to the operator in establishing situational awareness within the wildfire theatre and for deployment of firefighting resources. Various subsystems gather and condition data which is then fed to the display, at the instruction of the operator, to achieve presentation of the data considered most pertinent to the operator in combatting the wildfire.

The display 10 is generally a two-dimensional structure which would use one of a variety of display technologies including LED technology, LCD technology, CRT technology, or other two-dimensional display technology. The display 10 could be located at a ground command center or upon an aerial command center, such as an aircraft orbiting over the wildfire theatre. The display 10 could also be provided at multiple different locations so that commanders and others within the command structure can visualize data associated with the wildfire.

As one option, the display 10 could be a "virtual reality" goggles display worn by an operator. Such a display could allow the DEM data to be laid over a visual (e.g. color, black and white, infrared) video image with the DEM data aligned with coordinates actually being viewed through the goggles directly or by transmission from an aerial platform video camera or other image source. Similarly, the display 10 could be provided as a "heads up" display on or adjacent to an aircraft window.

Figure 2:
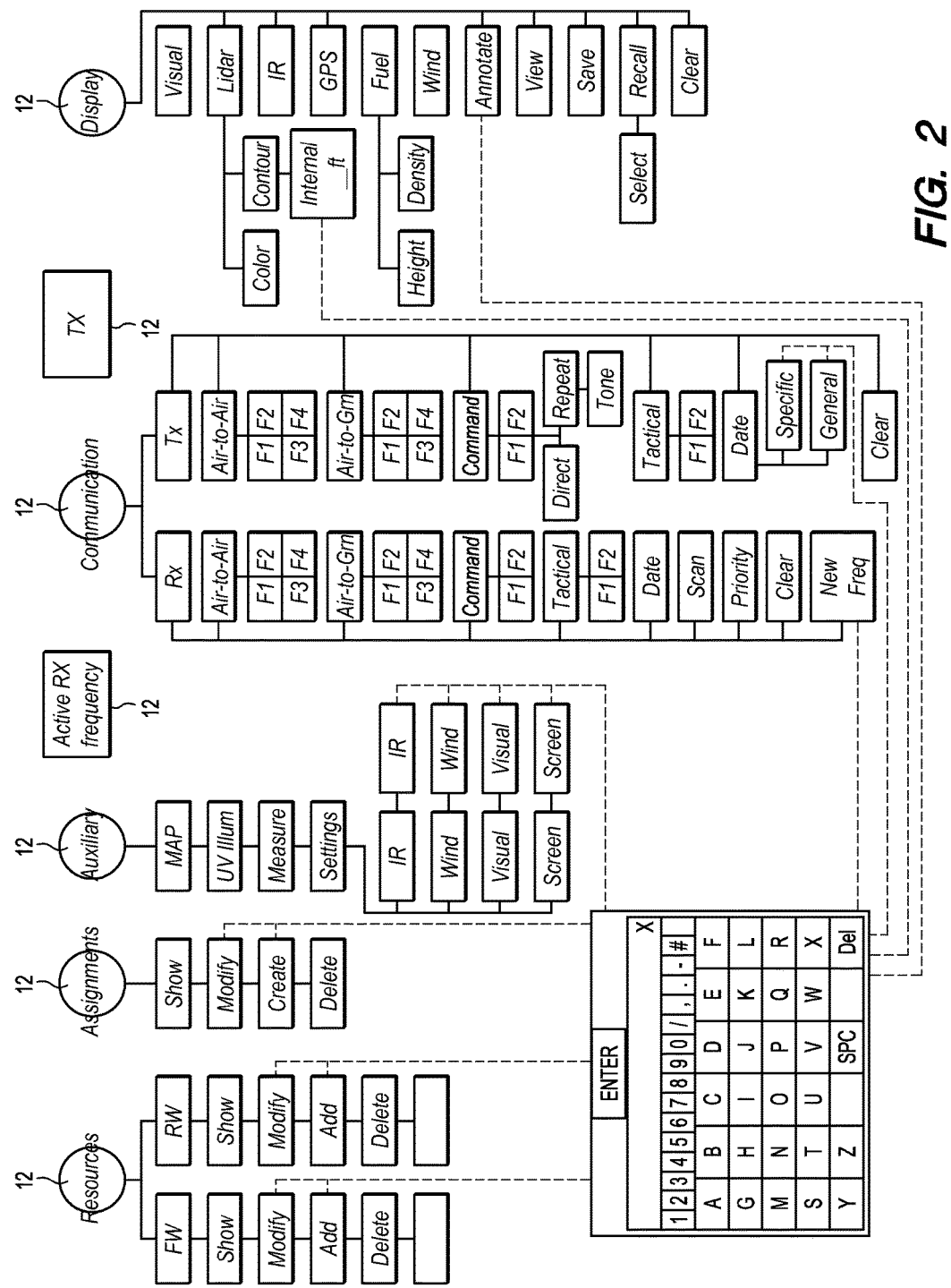
FIG. 2 is a schematic depiction of menu items selectable from tabs on the display of FIG. 1 to provide the display as a wildfire visualization and situational awareness tool, as well as to facilitate communications and assigning of firefighting resources.
Figure 3:
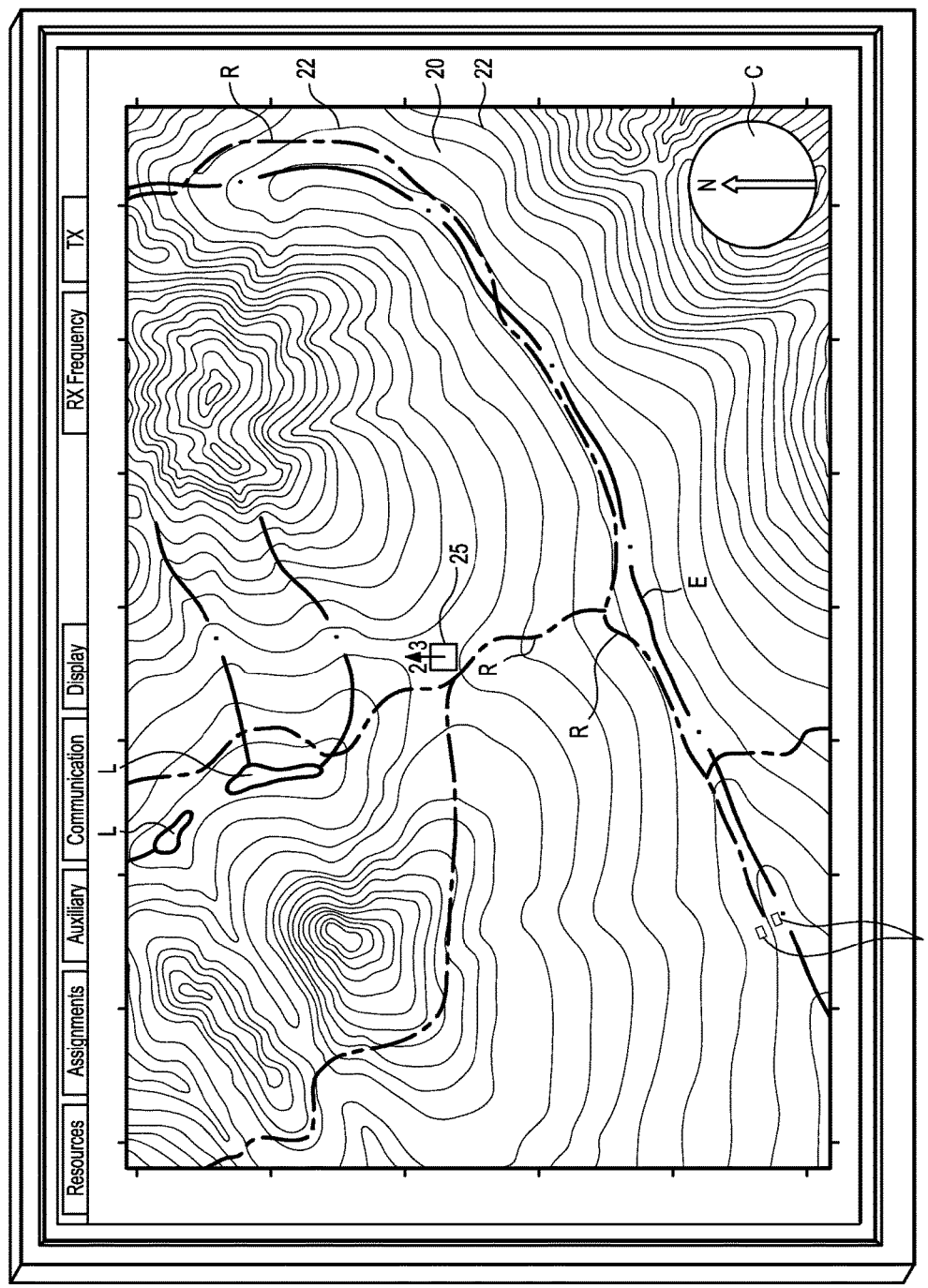
FIG. 3 is an enhancement to the plan view of FIG. 1 with geographic data and optionally wind and compass direction data added thereto.

The display 10 also includes menu tabs 12, typically at an upper edge of the display 10 which can be selected either through touch (if the display 10 is a touch screen), or through utilization of a stylus, joystick, mouse or other pointing device. Each menu tab 12, when selected, results in more menu options being visualized. The menu options being visualized are generally depicted in FIG. 2. These menu items would not all typically be simultaneously displayed, but rather would be displayed in useful subsets thereof (such as when the menu tab 12 identified as "resources" is selected, the "FW" (fixed wing) and the "RW" (rotary wing) two menu items would be visible only. When one of those menu items is selected, the remaining subordinate menu items might be displayed). Various different menu items, when selected, result in an alphanumeric keypad appearing on the display for input of alphanumeric details. As an alternative, a keyboard adjacent to the display can be utilized for such input.

Generally, and as one embodiment, clicking on a tab/icon 12 would open/activate and display the drop down menu; a second click would close. The user would have the option of dragging the top icon to place in their own selected order. The drop downs would follow the icons. Subsidiary menus would only show when the upstream item was selected. Clicking on a box would highlight and activate it. The voice radio functions would use the standard push-to-talk method for transmission on the selected frequency. The keyboard would appear when a box it was needed for was clicked as shown by the dashed lines. It could be dragged and would be used with the joystick.

Starting from the top left. The Resources icon when clicked would show the rotary wing "RW" and fixed wing "FW" boxes to be selected between. The chosen one would drop down its list of resources with a blank box at the bottom. As each blank box is filled in using the keyboard and after hitting "Add," and a new blank box would appear at the bottom of the column. Clicking on a resource and hitting "Delete" would remove the resource and collapse the column by one box. The list of resources could extend off the screen but could be scrolled to. This applies to both columns. Corrections could be made using the "Modify" box. Multiple personnel might be authorized to "Add"/"Delete" such data, such as on different displays 10 networked together.

The "Assignments" icon 12 would show previously given unit assignments, modify existing ones or create new ones. "Show" would display a list of previously generated assignments which could be scrolled through and selected from by clicking, and then changed using "Modify" and the keyboard. "Delete" would remove the selected assignment. The list of assignments could extend off the screen but could be scrolled to.

The "Create" tab would be for new assignments, "helicopter 517 support Division G with bucket drops," or "tanker 84 drop at the XX.XXXXX/-XXX.XXXXXX, bearing 126°, CL 6, load and return." This information when saved using "Enter" it could be accessed and sent using the selected data link from the communications menu.

The "Auxiliary" icon 12 would be used to create the initial or any subsequent Lidar base maps by clicking "Map." The next box under this icon would allow the UV illuminator (slaved to the visual/IR pointing direction selected) to be turned on and off. The next box under this icon 12 is a measuring tool similar to one in other mapping software, such as "Google Earth" provided by Google, Inc. of Mountain View, Calif. Select a point by clicking with the joystick and measure (and display) ground distances as the cursor is moved. The "Settings" box would allow the adjustment of the presentation of sensor produced data like contrast, sensitivity and other values. Not shown in the respective subsidiary "Adjust" boxes are the values that could be adjustable.

The communications icon 12 is generally similar to the features found in the control head of radios presently used but moves those functions into an integrated format and adds a few new ones. Clicking the "Communications" icon 12 would show the choice of working with either the transmit and receive frequency columns. Whichever was select would show the main frequency categories below. Subsequently, clicking on a frequency group would show the specific frequencies in that group. Clicking on a frequency would select it. A number of receive frequencies may be selected and scanned using the "Scan" button. One frequency may be given overriding priority by clicking the "Priority" button. The box to the left of the communications icon 12 would light up and show the frequency when one was active with a distinct signature for a priority frequency if enabled. The box to the right would show if transmission was occurring. The "Data" box would allow reception on data frequencies. The "Clear" button would remove all selections made in that column. The "New Frequency" box would allow previously un-programmed frequencies to be entered or brought into the display by clicking a box, "New Frequency," entering the value and then clicking the "Enter" box. In general, both columns operate similarly but only one transmit frequency can be selected at a time and the corresponding Rx frequency would be automatically enabled. The difference in the Tx data link is that there may be one or more frequencies (or access codes) devoted to specific uses such as air-to-air versus a general link for sharing screen views and the like with the ground.

Under the "Display" icon 12, the first five boxes of the column are devoted to screen layers that can be shown, such as canopy height, fuel density, geographic features, active burn area, annotations for resource assignment etc. Subsidiary boxes would control the display format, particularly with lidar.

The "Annotation" box would allow marking on the screen using the joystick to draw lines, circle areas, etc. or type in information at selected points using the keyboard. The "View" box would be used to create a synthetic lidar based view from a selected ground or near ground point and bearing. The "Save" box would specifically save a screen view, such as a synthetic view, a zoomed in close-up or anything else of note. The "Recall" box would recall saved views and the historical data at various standardized time intervals (e.g. 15 and 30 minutes, 1, 2, 4 and 8 hours) for display and/or transmission.

In FIG. 1 the display 10 is only provided with digital elevation map data 20. This digital elevation map data 20 is generally in the form of grade lines 22. These grade lines identify points of similar elevation and are connected together to provide a depiction of the topography of the terrain within the wildfire theatre. Other identifiers other than grade lines, such as shading, could alternatively be used to depict topography/altitude at the various coordinates.

To gather the DEM data a lidar equipped platform scans the wildfire theatre. This lidar platform would most typically be a fixed wing vehicle flown by appropriate aircraft piloting personnel. The lidar equipped platform also typically transmits the DEM data to the location (or locations) where command personnel and the display 10 are located. As alternatives, the aerial vehicle could be a rotary wing vehicle, a satellite, or some other elevated platform. The vehicle or other platform could be manned or unmanned. In one embodiment the vehicle is a fixed wing vehicle which remains onsite gathering and updating lidar data continuously. As another alternative, lidar data is refreshed by re-flights periodically, such as once a day or multiple times a day.

As an example, simple lidar equipped unmanned rotary wing aircraft ("drones"), often with multiple propellers (e.g. "quad-copters," hexacopters, etc.) could be deployed in the field, and optionally tethered to a vehicle to ensure control over the vehicle. The drones would rise, such as to a predetermined altitude above the surface, and perform lidar scanning of the adjacent area.

Figure 4:
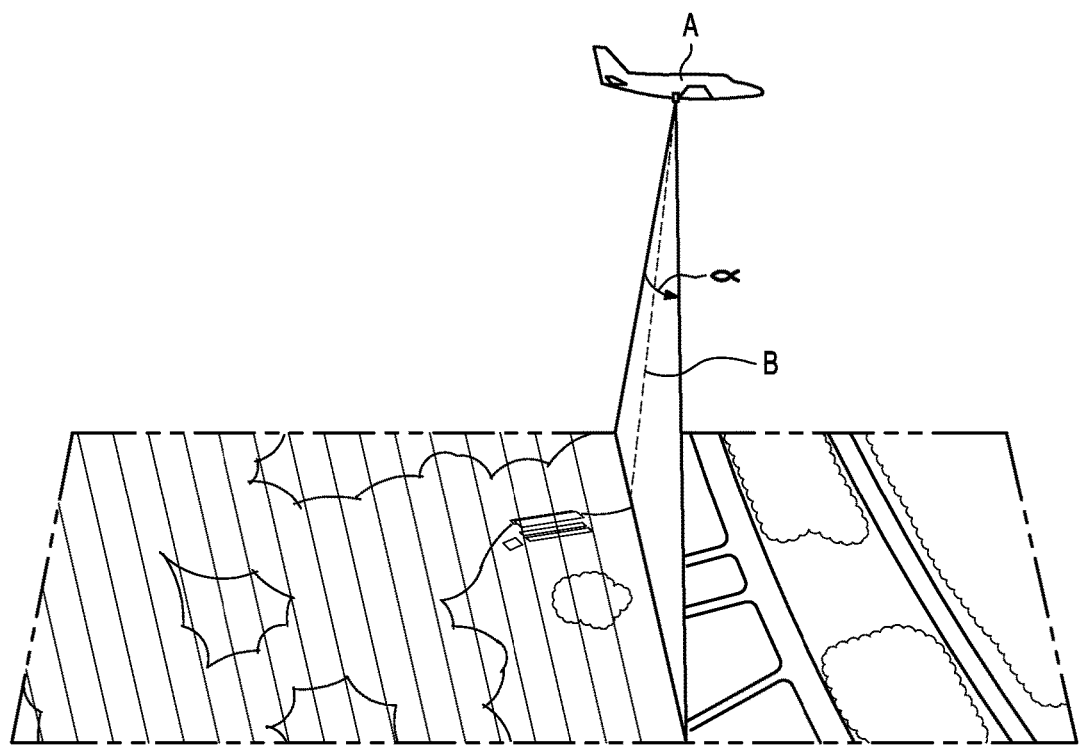
FIG. 4 is a perspective schematic depiction of a lidar equipped aircraft gathering lidar data for use in establishing the digital elevation map depicted in FIGS. 1 and 3.

Lidar functions, as generally depicted in FIG. 4, by emitting a laser pulse and then having a light sensitive sensor detecting the reflected laser pulse. A time delay between emission of the laser pulse and reflection of the laser pulse is representative of elevation. A laser beam very rapidly follows a scanning path and reflection data is gathered on an ongoing basis and correlated with the orientation of the laser at the instant of emission of the laser pulse, as well as the GPS coordinates of the aircraft (or other positioning methods) so that precise elevation data is gathered by the reflection of the lidar pulse and is correlated with other coordinates within the wildfire theatre. Such other coordinates would typically be in the form of latitude and longitude coordinates, but could be other appropriate coordinates. A resulting lidar data dataset is gathered which provides the digital elevation map (DEM) such as that depicted in FIG. 1. While grade lines 22 are utilized in this DEM, shading or other techniques could be utilized to represent elevation.

Other information which can be superimposed upon the DEM can include a compass direction C and indications of wind direction and velocity 25. For instance, various different ground stations might be monitoring wind speed and direction and this data can be uploaded and added to the digital elevation map. Also, lidar doppler can be used to measure wind speed and direction. This data can then be added to data shown on the display. As one option, the wind speed/direction data is an arrow pointing in the direction of the wind and a number adjacent thereto representing wind speed. The number of wind speed locations to display can be selected by the user. Geographic terrain information can also be added to the DEM. For instance, some geographic features can be detected by the lidar. Bodies of water will have a recognized near totally flat form and precise reflection and can be interpreted as bodies of water and appropriately displayed on the DEM. Other geographic features such as manmade structures 24 (e.g. houses, water towers, industrial facilities, schools, towns, etc.) can also be detected in the lidar data and displayed as icons or otherwise as geographic information. Other manmade structures can include roads R and electric power lines E. Through utilizing the various menu options, such as those provided under the display tab 12, the operator can choose which such data to add to the DEM and appear on the display 10. An operator can also choose which source to rely upon in providing details for the DEM appearing on the display 10. For instance, the operator can select whether to rely more heavily upon lidar data or upon pre-existing map data for various geographic features appearing within the DEM dataset appearing on the display 10.

Figure 5:
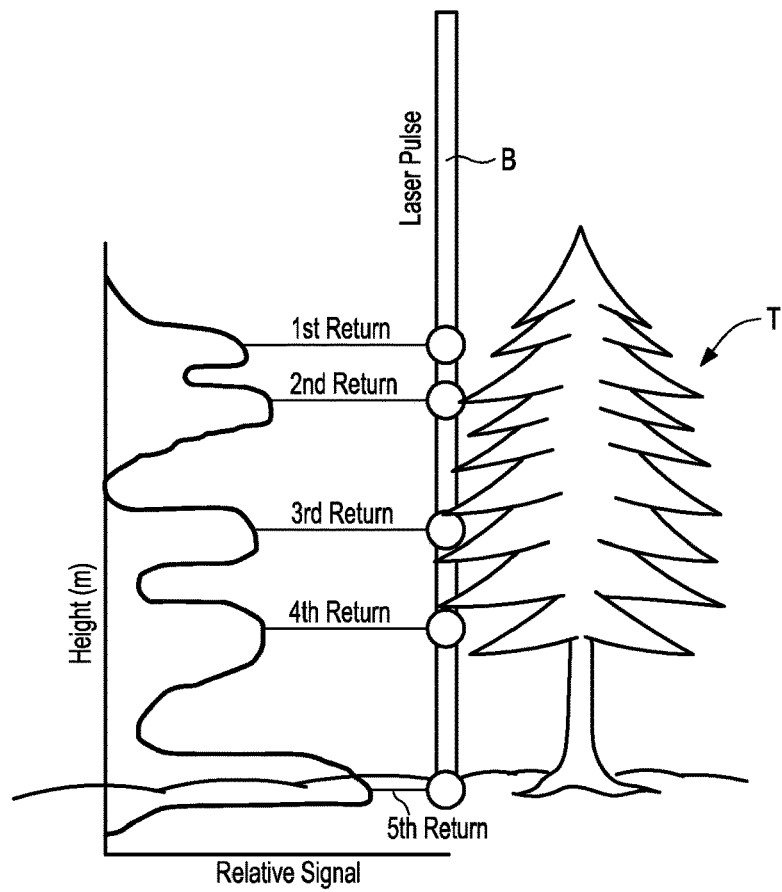
FIG. 5 is an elevation schematic representing how laser pulses from a lidar platform can receive multiple return signals indicative of canopy height and fuel density.
Figure 6:
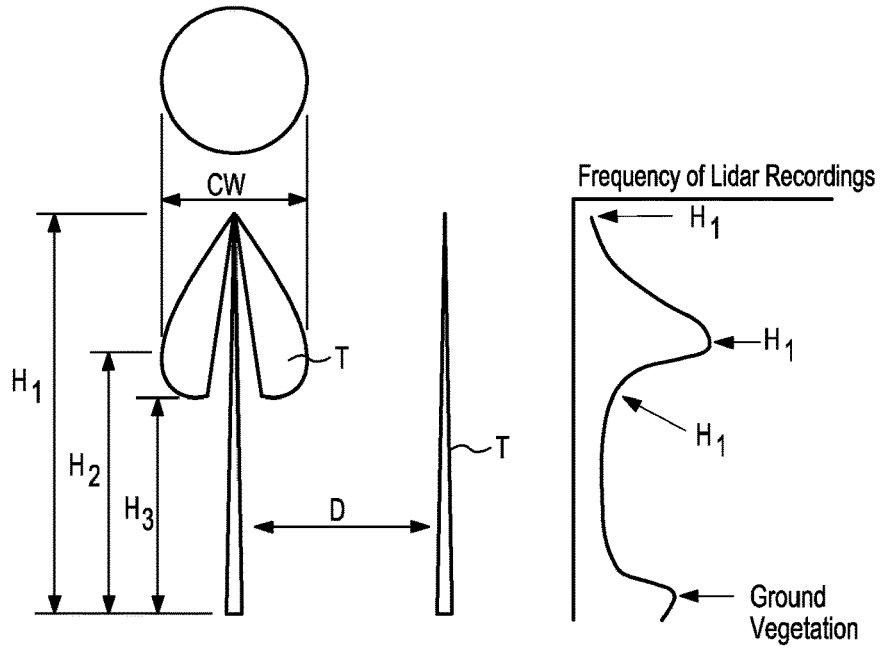
FIG. 6 is a further side elevation graphical representation of how lidar multiple reflection data is indicative of fuel density.
Figure 7:
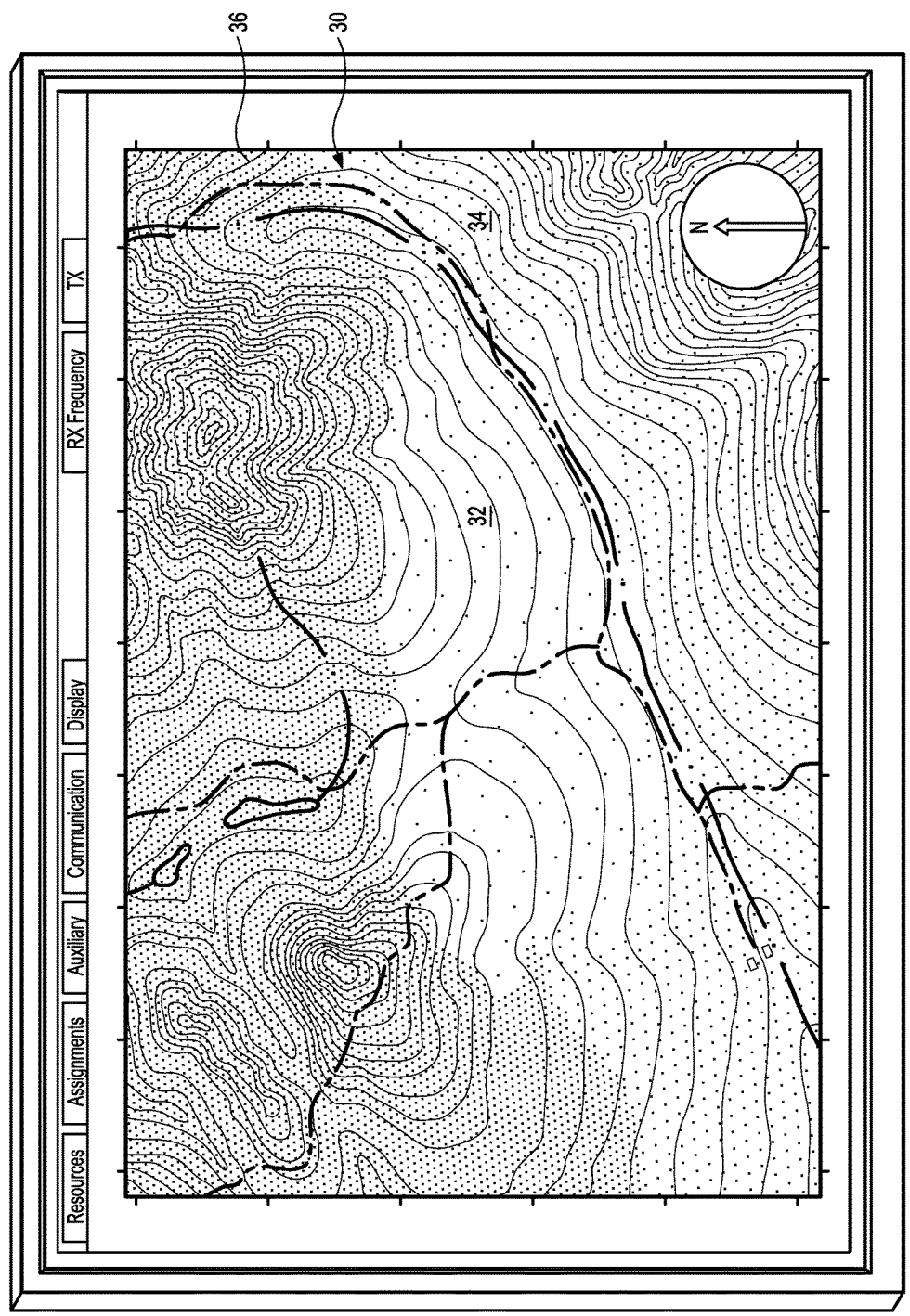
FIG. 7 is a variation upon the plan view of FIG. 3 with fuel density and/or canopy height data superimposed thereon.
Figure 8:
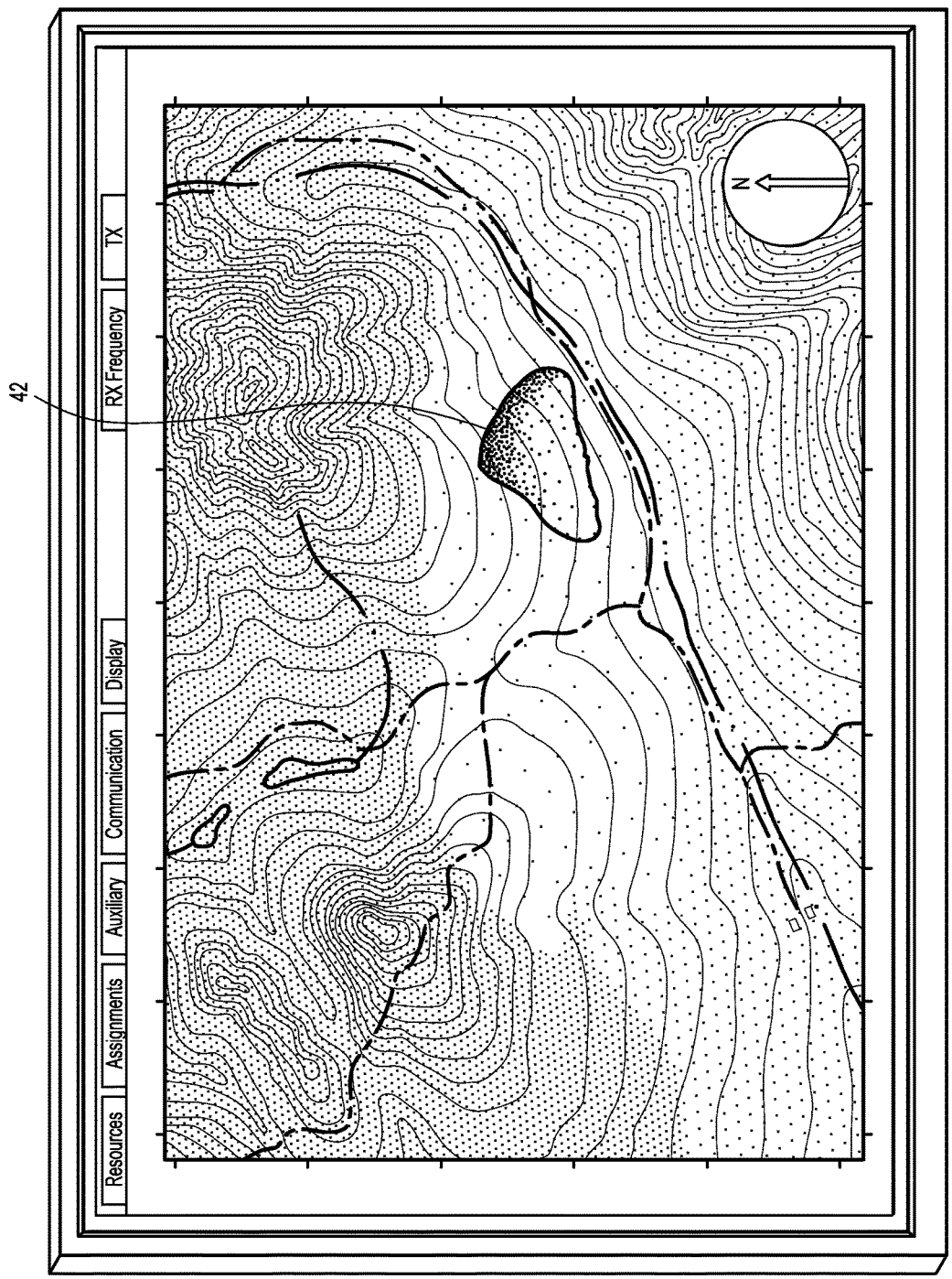
FIG. 8 is a plan view of that which is shown in FIG. 7 with active wildfire area superimposed thereon, such as would be gathered from infrared sensor data of the wildfire theatre.

Of perhaps most use to the operator of the display, is to include information upon the display 10 and within the DEM dataset as to characteristics of the vegetation within the wildfire theatre. In particular, canopy height and fuel density data can be included upon the DEM shown on the display 10 (FIG. 7). As shown in FIGS. 5 and 6, laser pulses from the lidar scanner receive multiple reflected returns when the laser pulse encounters a surface other than a plain flat surface. Upper reaches of a canopy will provide a first return. Lower reaches of a canopy may provide multiple further returns. A final typically heavy return will occur from the ground.

If the return is concentrated at a single elevation, such a return is indicative of ground relatively free of undergrowth beneath the canopy. If this final return is more attenuated with multiple small reflections therein, such a return can be indicative of heavy ground fuel including brush etc. Through careful experimentation, lidar scanners can scan a variety of different vegetation types. The particular multiple return signatures produced by the lidar scanner when scanning multiple different vegetation types can lead to correlations being drawn between particular multiple return signatures and particular fuel densities.

Such experimentation with the lidar scanner can result in a database correlating multiple return lidar signatures with particular fuel densities. Then, when the lidar data is gathered its multiple return signature can be compared to this database to output a fuel density for the coordinates being scanned. Each coordinate can thus have a fuel density associated therewith which can be added to the DEM.

As one tool for calculating fuel density, a ratio of a final return to the sum of all (or a subset) of the returns from the same pulse is established. This ratio correlates with fuel density. In other embodiments, significant gaps between first reflections (indicative of canopy height) and the next reflection indicative of ground fuel can be used as a measure of the extent of "ladder fuels" that might allow a grass fire to climb into leaves and branches of adjacent trees, which vegetation quality, if mapped with the DEM can be valuable to command personnel.

In some instances, this fuel density might merely be a probability of a particular fuel density rather than a certainty of fuel density, but still provides useful information to a firefighting command officer. Furthermore, the lidar data actually gathered can be correlated at particular coordinates where skilled personnel are located with visual observations from the skilled personnel on the ground. Such onsite verification can be utilized to verify that the fuel density estimates and vegetation character data provided by the multiple return signature are accurate and reliable or require some degree of adjustment.

Similarly, canopy height can be gathered by the lidar sensor by merely comparing a first return with a last return for each laser pulse. A difference between these two returns is indicative of a canopy height above ground. Canopy height can be useful both in predicting future wildfire behavior and also in accurately deploying firefighting personnel in that different tactics are utilized in tall canopy situations than in low canopy situations. Furthermore, canopy height can be utilized to provide valuable information to firefighting agent application resources, such as airborne firefighting resources, so that they have an indication of how tall the canopy is in the area where they are flying, to provide an additional margin of safety when necessary in fighting fires where a tall canopy is present.

In one embodiment of the invention, aerial firefighting vehicles are controlled autonomously (or piloted remotely). In such circumstances, the coordinates produced by the lidar scanner would be provided so that the aerial firefighting vehicle would match the terrain (plus a designated spacing amount) to place the aerial firefighting vehicle just above the canopy (plus a margin of error). Autonomous firefighting vehicles can thus operate within a narrow band of elevation typically lower than that of manned firefighting aerial vehicles and utilizing canopy height as one characteristic for effective navigation. Such unmanned aerial firefighting vehicles also provide the opportunity for flying in the dark and in heavy smoke or other low visibility conditions to enable more aggressive firefighting techniques, even if requiring smaller payloads in some instances, which can potentially be multiplied by utilizing a larger number of such aircraft. Such autonomous aircraft could be in the form of rotary wing aircraft or fixed wing aircraft and could supply water or other firefighting agent at the direction of a commander.

To display the fuel density data on the display 10, fuel density shading 30 is provided (FIG. 7) as graduated surface shade lines of differing density. In FIG. 7 this fuel density shading 30 is broken into low density fuel 32 shading, medium density fuel 34 shading, and high density fuel 36 shading. For convenience, heavier shading represents the high density fuel 36, medium density shading represents the medium density fuel 34 and low density shading represents the low density fuel 32. However, most preferably fuel density would be depicted by graduations in color. For instance, a darker brown shading might represent high density fuel. A medium brown color might represent medium density fuel and a lighter brown color might represent low density fuel. Similarly, canopy height could be depicted by graduations of color or by variations in surface shading.

While the fuel density shading 30 is provided to represent fuel density, it could alternatively be provided to represent canopy height. For instance, a region of highest canopy 36, medium canopy height 34 and low canopy height 32 could be shaded distinctively, or provided with different colors. As one option, darker green could represent a taller canopy, medium green could represent a medium height canopy and lightest green could represent a lowest elevation canopy. The brown and green colors could be shown together on the map, such as with an alternating checkerboard pattern superimposing the green and brown shades together. As another alternative, an operator could select back and forth between fuel density and canopy height depending on the needs of the operator. Other colors could also conceivably be utilized. Other vegetation data, such as vegetation type, or presence/absence of ladder fuels could also be similarly depicted above or with other data.

As a next subset of data added to the display 10 through the digital elevation map, a burn area 40 can be depicted, preferably also with an active fire edge 42 depicted thereon. To gather active fire data, the lidar scanner described above could be utilized, such as with areas having a strong single laser pulse return indicative of areas that have been burned out. However, most preferably the active fire burn area 40 data is provided by an infrared sensor which measures heat from the wildfire itself. Areas of highest heat would be designated as an active fire edge 42 of a burn area 40, represented by data which has an elevated but not particularly high temperature signature. Over time, burn area may cool to surrounding temperatures, but might be maintained as the burn area from prior data taken previously, when the area did have a temperature signature indicative that it is a burn area. Older data thus can be queried to establish locations for cool burned areas.

In one embodiment, the same aerial platform, such as a fixed wing aircraft overflying the wildfire theatre, includes both a lidar scanner and infrared scanner and supplies infrared scanner data correlated with coordinates in a manner akin to that with which the lidar elevation data and fuel density and canopy height data are provided. In such a manner, a realtime or near realtime depiction of both elevation, fuel density, canopy height and burn area, including active fire edge can all be simultaneously provided upon the display 10 to be at the disposal of command personnel.

The above description describes a display 10 which provides a high degree of situational awareness to an operator, such as an incident commander (IC) or air tactical group supervisor (ATGS) tasked with fighting the wildfire. Such operators, so informed by the display 10, have knowledge of the topography of the terrain involved, as well as canopy heights of the terrain involved and fuel density of the terrain involved. Such operators also have a clear depiction of the coordinates of the burn area and the active fire edge. The display also is overlaid with geographic features unique to the wildfire theatre such as lakes, roads, rivers, power lines, structures and other pertinent details. Furthermore, various different indications on the display can be indicative of wind speed and direction.

This large amount of information is highly valued by an experienced firefighting commander who also brings to the firefighting endeavor the commander's experience as to wildfire behavior and the effectiveness of various different firefighting resources, as well as the time required between assignment of a firefighting resource and deployment of and effective impact of the firefighting resource. The commander using such a display 10 is thus in an ideal position to assign firefighting resources under command to effectively combat the wildfire.

In one embodiment the display 10, augmented with the DEM data as described above, can merely utilize this display 10 for situational awareness and then utilize known existing techniques for assigning wildfire fighting resources to combat the wildfire. However, in a most preferred embodiment of this invention the display 10 also acts to assist the operator in assigning of wildfire resources. The resources tab 12 can be selected by the operator so the operator can see a list of available fixed wing assets and rotary wing assets. As new assets come online and are available they can be added to the list. As assets become unavailable, such as when being pulled offline for maintenance or pilot rest periods they can be taken off of the resource list. In one embodiment the resources would be managed by subordinate personnel to the commander so that the commander would not need to be distracted with the task of keeping the list of resources current, but merely utilizes the list of resources currently available for the making of tactical decisions.

To strategize the fighting of the wildfire, in a typical scenario an operator will study the burn area and active fire edge of the burn area, and study the surrounding terrain including fuel density, canopy height, wind direction, surface elevation contour (e.g. fire burning uphill or fire burning downhill) and other factors such as time of day, humidity, expected future weather and visibility conditions. The commander can also readily identify most sensitive areas to be defended from wildfire, such as man-made structures or environmentally sensitive areas.

Figure 9:
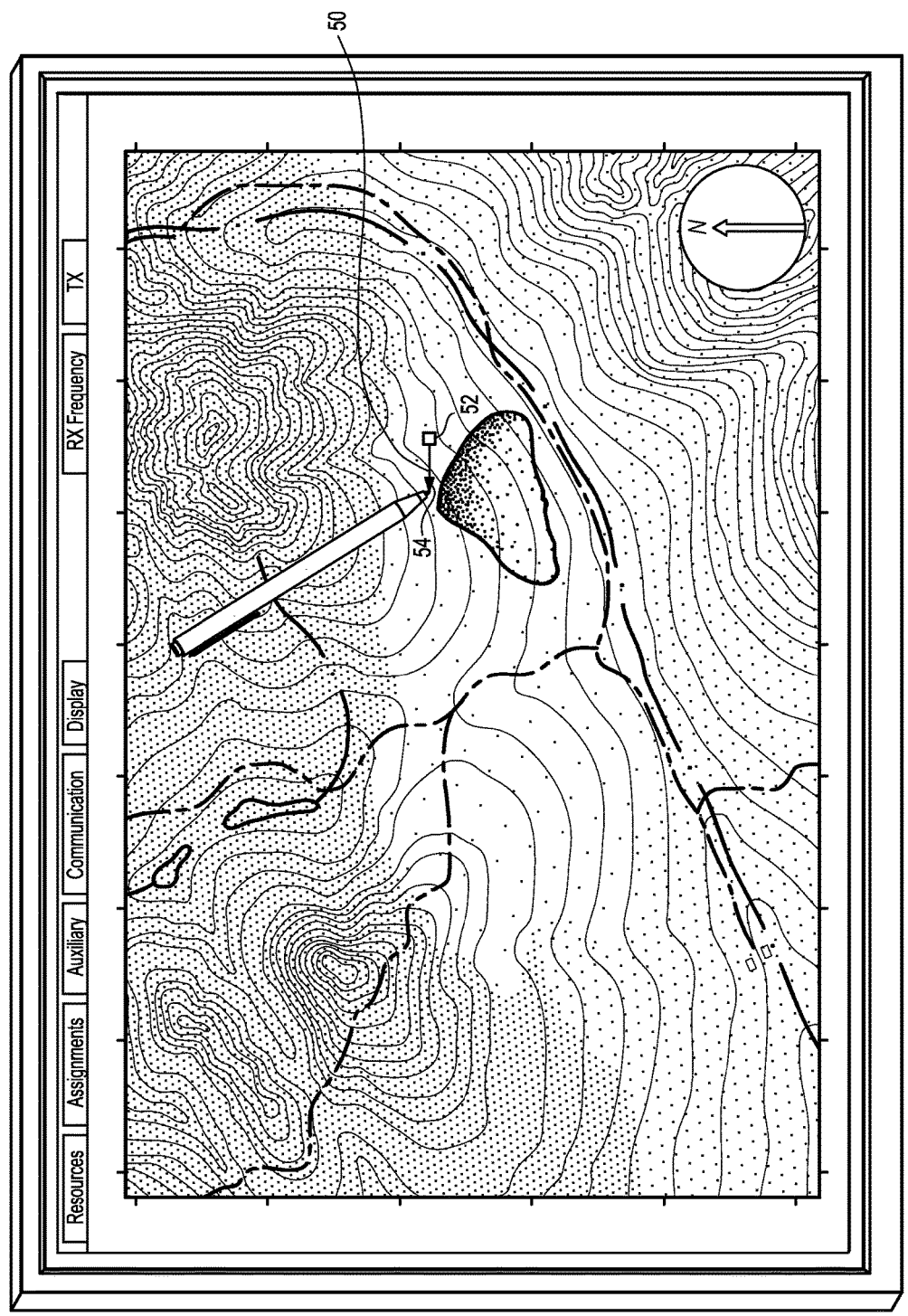
FIG. 9 is a plan view of that which is shown in FIG. 8 with annotations supplied, such as by a stylus in the implementation of wildfire strategy through the display of FIG. 9.

To assign resources, the operator will select a region on the display 10 to be treated with a firefighting agent. FIG. 9 depicts utilization of a stylus to draw a line in the form of a vector as a form of mark annotated onto the display. This vector line has an origin and extends in a direction representing a heading. While a stylus is shown for convenience, the display 10 could be interacted with in a similar fashion utilizing a touch screen and the finger of the operator. Most preferably a joystick is utilized which is capable of movement in two dimensions to move a pointer anywhere on the display 10. A button ("activation switch") on the joystick allows for the pointer to change from inactive to actively drawing a line such as the vector. When the button on the joystick is first pushed, an origin of a vector begins. Movement of the joystick away from the origin results in a heading for the vector. After the vector is drawn, the operator can study the vector and choose to erase the vector if it is not positioned where desired, or to optionally modify the vector, such as to change an origin of the vector, change a heading of the vector, or change a length of the vector.

In one embodiment the operator would first select a firefighting resource (e.g. rotary wing (RW) aircraft) and/or firefighting agent (e.g. polymer gel emulsion for striping (FIG. 14)) before drawing the vector. Resources have different capacities, such as firefighting agent payloads. A length of a line upon which a firefighting agent can be dropped could be correlated with every such firefighting asset. For instance, a helicopter with a bucket of known size drops water (or other agent) in a concentrated area, so the vector would be relatively short. Large fixed wing aircraft would drop a longer line/area, so the vector could be longer. In one embodiment, vectors cannot be drawn any longer than a line which can be achieved by one drop from the selected firefighting asset. In this way, an operator has immediate feedback that multiple assets may need to be utilized to provide a longer line of firefighting agent, or if only one asset is available, to utilize that asset as productively as possible given the limitations of payload provided by the asset. As an alternative, after the vector has been drawn, an operator can select which asset to be assigned to that vector.

When the operator has determined that the vector and the asset assigned thereto are appropriate, the operator can assign the asset. In one embodiment a menu item can be selected to cause the vector to be implemented by a selected firefighting asset so that that asset is given the origin and heading coordinates and is assigned to fly to that location and dispense the appropriate firefighting agent as selected by the commander. While there is some time delay between assignment and placement of the firefighting agent, there is an opportunity for the operator to recall the resource if circumstances change and the placement of the agent is no longer required, or to provide a last minute adjustment, such as a new origin location or heading. Personnel operating the aerial firefighting resource can confirm when the drop has occurred and the display can be updated to indicate that the drop has occurred rather than that it is "pending." Later, if the firefighting agent is ultraviolet luminescent, an ultraviolet light can scan the wildfire theatre and cause the agent to luminesce in the visible spectrum to provide confirmation as to the precise location where the wildfire agent has been placed. In such a manner, the most precise information is fed back to the command personnel viewing the display 10 so that they can see precisely where the firefighting agent has been placed (FIG. 10), for further annotation to assign the next resources.

Figure 10:
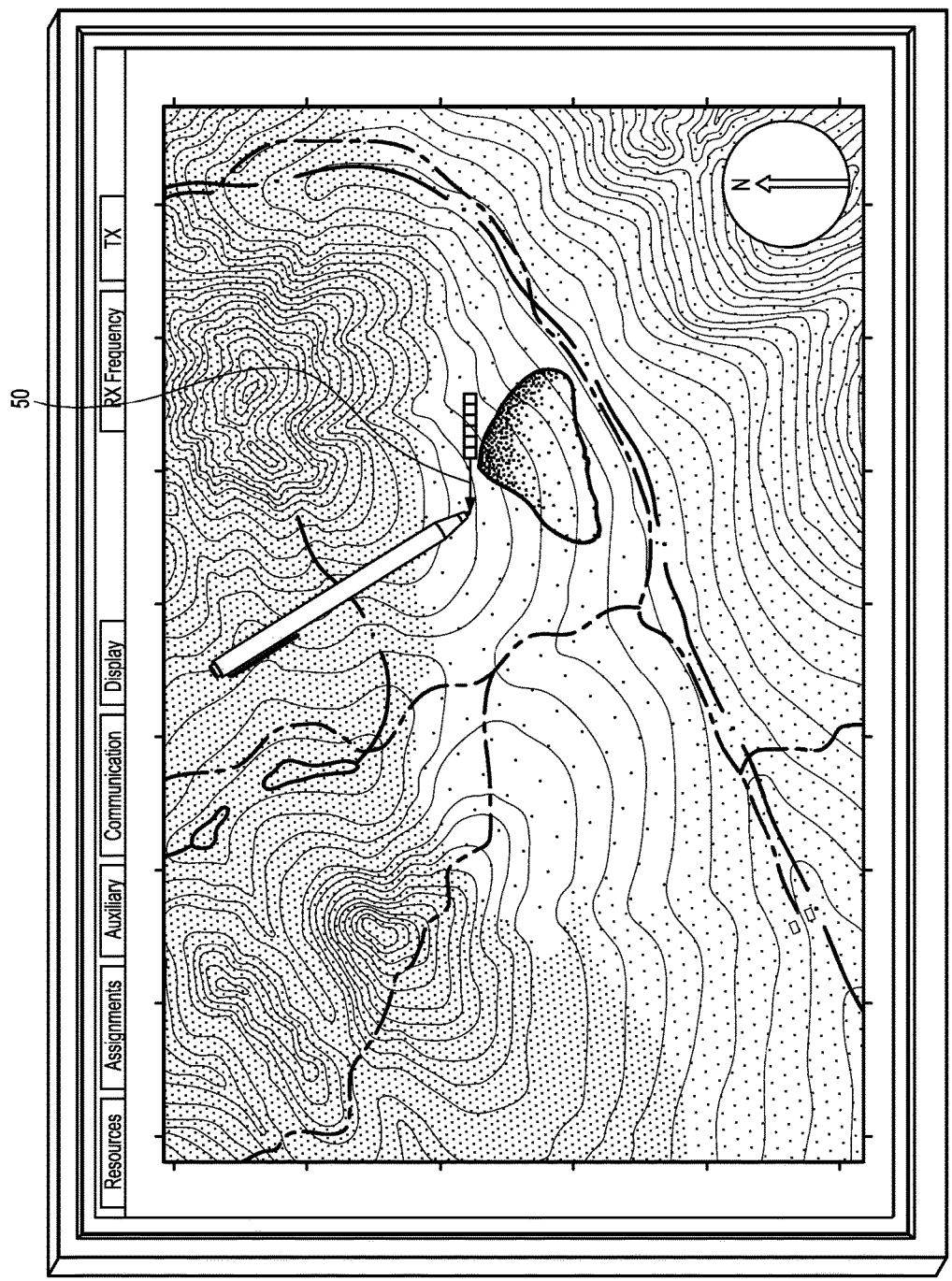
FIG. 10 is a variation of that which is depicted in FIG. 9 after passage of time and with further strategic deployment of wildfire resources through the display and taking into account prior assigned firefighting resources to further combat the wildfire.

The DEM data shown on the display 10 and all of the various subsets of data including burn area and active fire edge can be continuously updated utilizing the various subsystems described above. Actual placements of firefighting agent can also be provided on the display 10. Thus, as time progresses, and as the situation changes on the ground, the display 10 also changes to reflect these modifications (FIG. 10). The operator's firefighting tactics and assigned resources thus remain most pertinent to the present situation, rather than relying too heavily on old data which may or may not be accurate.

While the display 10 can be utilized within a command structure to most effectively utilize a limited number of firefighting resources, such as fixed wing and rotary wing aircraft, such a display can also be utilized to bring a larger number of resources to bear on a fire over a shorter period of time. For instance, the various assignment instructions provided to different aircraft can be inspected by automated systems to ensure that the instructions to do not overlap in a manner which would cause multiple aerial vehicles to occupy too close to the same space at too close to the same time. Warnings could be provided back to command personnel or to aerial vehicle operators in appropriate circumstances to avoid collisions. Furthermore, ground crew assignments can be integrated into the data presented with the DEM on the display. Optionally, command personnel on the ground could also have access to the display 10 or a coordinated additional display 10 and be able to also assign (or request an assignment) of an aerial firefighting resource.

Figure 11:
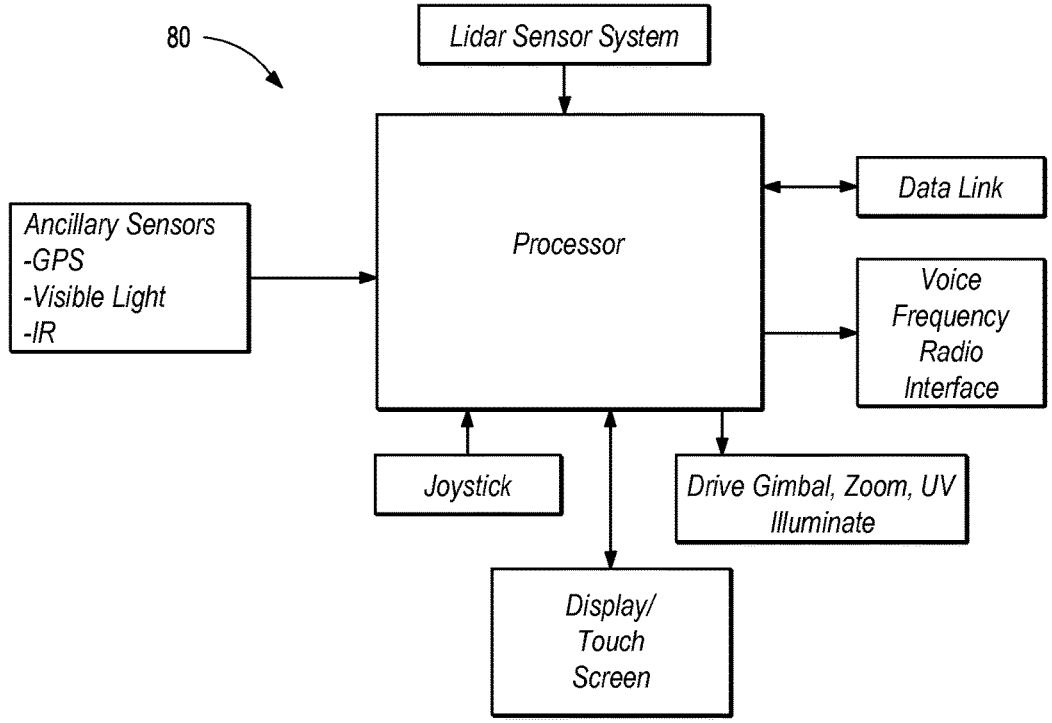
FIG. 11 is a schematic depicting various elements of hardware utilized to implement the system of this invention.
Figure 12:
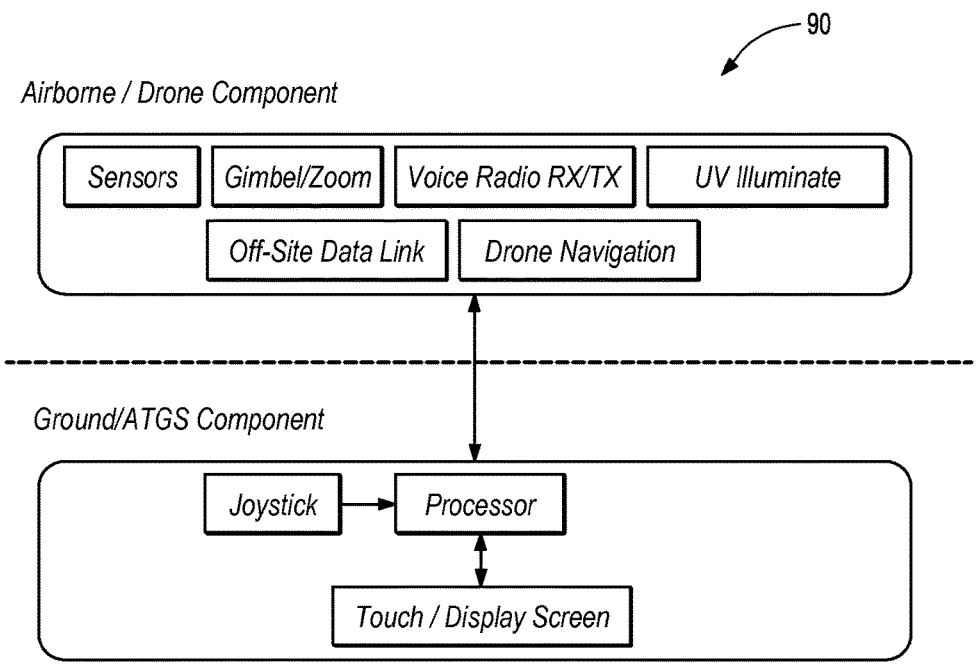
FIG. 12 is a schematic illustrating how various components of the system are divided into command components at the location of command personnel and other components of the system located remotely and with communication therebetween.
Figure 13:
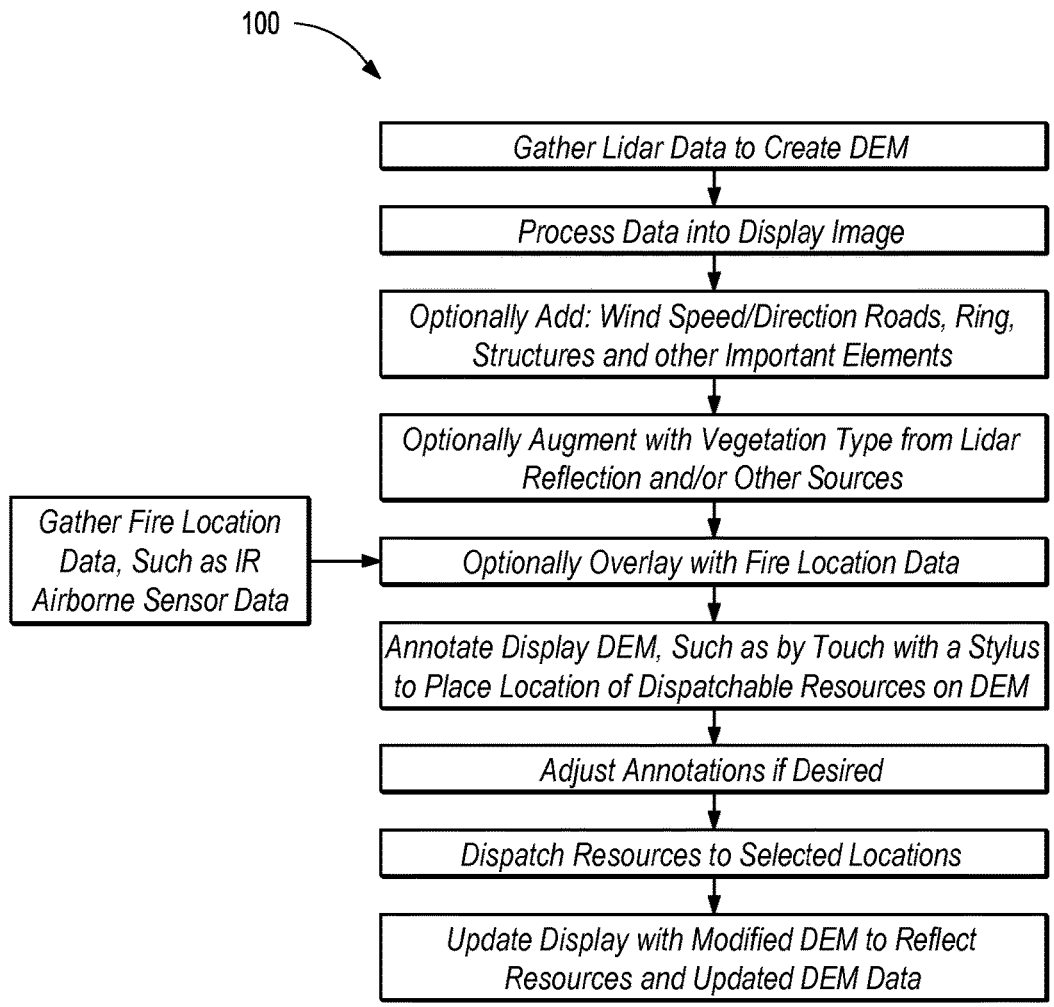
FIG. 13 is a flowchart of one embodiment of this invention illustrating steps in the process of producing the display of FIGS. 7-10 and utilizing the display to assign firefighting resources in combatting the wildfire.
Figure 14:
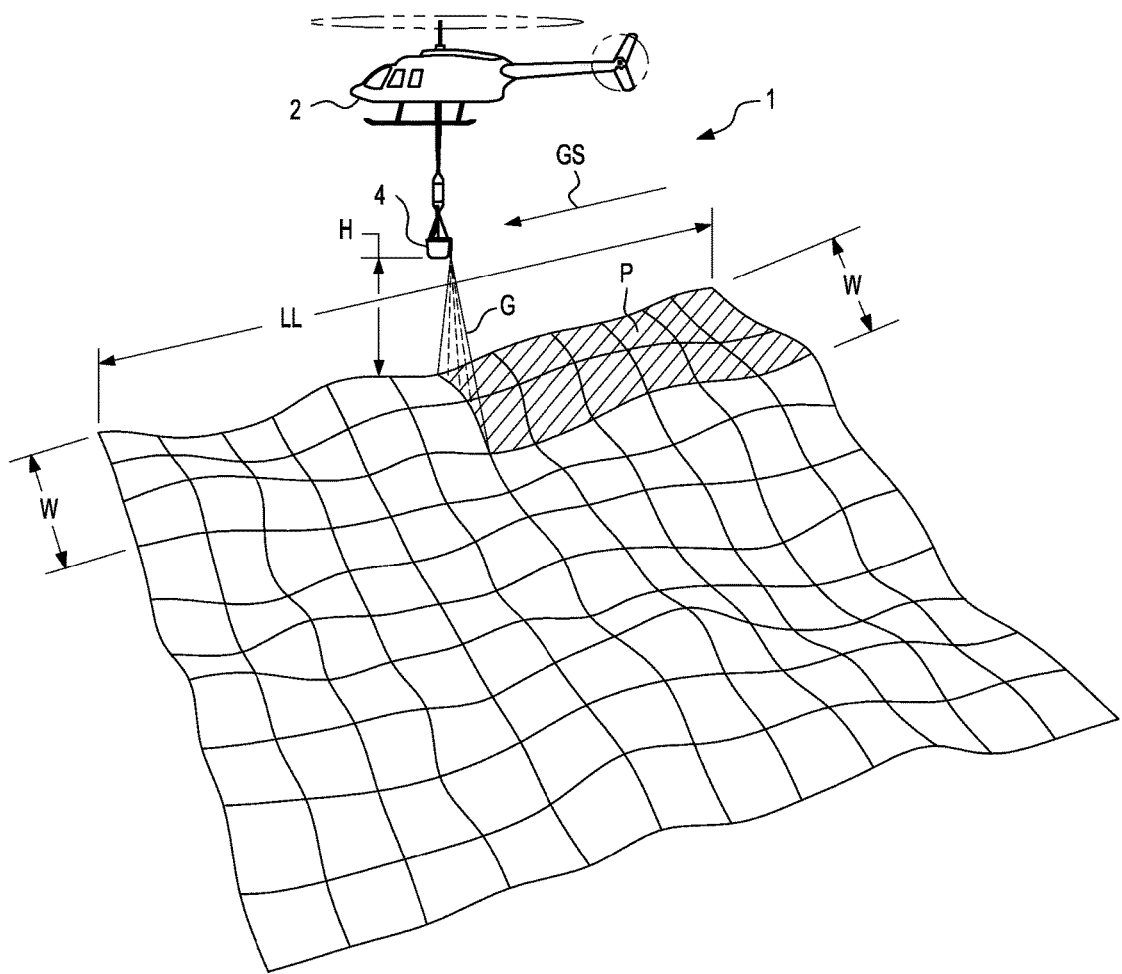
FIG. 14 is a perspective schematic view of a wildfire airborne firefighting resource in the form of a rotary wing vehicle executing a striping procedure with activated polymer gel emulsion to lay down a stripe upon designated coordinates, such as in the form of a fire line or in support of a fire line in combatting the wildfire.

FIGS. 11 and 12 illustrate various physical components and how they interrelate to implement the systems and methods of this invention. FIG. 13 illustrates a series of steps used in one method of this invention. FIG. 14 depicts a striping method 1 from U.S. patent application Ser. No. 14/747,794 incorporated herein by reference in its entirety, which can place various firefighting agents G as a spray from a bucket 4 suspended from a rotary wing aircraft 2. The craft 2 flies at ground speed GS and lays down a stripe P of agent (typically polymer gel emulsion in water, but optionally other agents) with a width W controlled at least partly by a height H. A length LL of the stripe P is also illustrated, such as representing a maximum payload per drop for the system 1. Other craft can also be assigned and provide other firefighting agents at the location specified.

In one embodiment of the invention at least some, and potentially all of the airborne firefighting resources are replaced with unmanned drones either piloted remotely or configured to merely follow coordinates from a start location to a firefighting agent drop location, and back to a refueling and firefighting agent replenishment location. By removing human pilots from the vehicles themselves, the risk of loss of flight crew personnel due to too many aerial vehicles occupying too close of a space is attenuated so that a still greater number of aerial firefighting vehicles can be utilized. Such systems would also facilitate operations at night or in heavy smoke or other low visibility conditions.

The same data provided on the display 10 to provide situational awareness to command personnel can be utilized to provide coordinates and appropriate headings for unmanned aerial firefighting vehicles to fly to designated areas, drop designated firefighting agents and return to base. A near limitless number of firefighting resources could thus conceivably descend upon a wildfire in such a short period of time that even the most intense wildfires would be overwhelmed by the wildfire agents deployed by the aerial resources. Wildfires would thus be snuffed out before their propagation results in nearly as much damage as would otherwise be the case. The economics associated with bringing exceptionally large numbers of resources to bear on a wildfire over a relatively short period of time (hours or days, rather than days or weeks) result in economic savings due to the quicker attainment of control over the fire. Similar resources can be redeployed at new locations, leaving the smoldering remains of small wildfires for ground crews to "mop up."

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A method for fighting of wildfire based upon rapid and accurate visualization of a wildfire theatre including the steps of:
flying a lidar equipped aerial vehicle over the wildfire theatre;
gathering elevation data for the wildfire theatre through lidar data gathered by the lidar equipped vehicle;
matching the elevation data with associated coordinates for the wildfire theatre;
producing a digital elevation map of the wildfire theatre using the elevation data and the associated coordinates therefore;
displaying the digital elevation map as a depiction of terrain in the wildfire theatre;
analyzing the lidar data to determine density of combustible fuels at the associated coordinates and adding a visual depiction of fuel density to the digital elevation map; and
detecting multiple returns for a laser pulse from the lidar equipped aerial vehicle and comparing the intensity of the multiple returns for the laser pulse to each other, and correlating a multiple return signature to fuel density.

2. The method of claim 1 including the further step of analyzing the lidar data to determine vegetation canopy height at the associated coordinates and adding a visual depiction of canopy height to the digital elevation map.

3. The method of claim 1 wherein said visual depiction of fuel density includes color variation on the digital elevation map to represent fuel density.

4. The method of claim 1 including the further step of analyzing the lidar data to determine vegetation canopy height at the associated coordinates and adding a visual depiction of canopy height to the digital elevation map for display along with depiction of fuel density, wherein said visual depiction includes shading variation on the digital elevation map to represent canopy height.

5. The method of claim 1 including the further step of analyzing the lidar data to determine vegetation canopy height at the associated coordinates and adding a visual depiction of canopy height to the digital elevation map, and wherein said displaying step includes selectively viewing fuel density and/or canopy height.

6. The method of claim 1 wherein said analyzing step further includes comparing a final return form the multiple return signature to a sum of at least a portion of returns preceding the final return to identify a fuel density.

7. The method of claim 1 including the further step of identifying geographic features within the lidar data taken from the group of geographic features including at least one of: lakes, roads and man-made structures, and including such geographic features in a recognizable fashion within the digital elevation map.

8. The method of claim 1 including the further step of adding geographic features from pre-existing map data for the same associated coordinates taken from the group including at least one of: lakes, roads and man-made structures, and adding at least one of these geographic features to the digital elevation map.

9. The method of claim 1 including the further step of adding wildfire data to the digital elevation map specifying at least location details for at least one wildfire within the wildfire theatre.

10. The method of claim 9 wherein said adding wildfire data step includes gathering infrared data within the wildfire theatre and associating the infrared data with at least some associated coordinates for the wildfire theatre to depict the infrared data as wildfire data within the digital elevation map.

11. The method of claim 1 including the further step of integrating the digital elevation map into a display which also includes communications control functional accessories to allow a firefighting commander to both visualize the wildfire within the wildfire theatre and also access communications equipment for communicating to authorize personnel within the wildfire theatre.

12. The method of claim 1 including the further step of sharing digital elevation map data of said displaying step to multiple command personnel at different locations for coordinating firefighting activities.

13. The method of claim 1 including the further step of gathering infrared data, ultraviolet data and lidar data from a common aerial vehicle to produce data for the digital elevation map, including terrain in the theatre, active fire areas and prior ultraviolet luminescent firefighting agent placement.

14. A method for fighting of wildfire based upon rapid and accurate visualization of a wildfire theatre including the steps of:
flying a lidar equipped aerial vehicle over the wildfire theatre;
gathering elevation data for the wildfire theatre through lidar data lathered by the lidar equipped vehicle;
matching the elevation data with associated coordinates for the wildfire theatre;
producing a digital elevation map of the wildfire theatre using the elevation data and the associated coordinates therefore;
displaying the digital elevation map as a depiction of terrain in the wildfire theatre;
adding wildfire data to the digital elevation map specifying at least location details for at least one wildfire within the wildfire theatre; and
wherein said adding wildfire data step includes adding both an active front of a wildfire area and a burn area of the wildfire are together upon the digital elevation map.

15. A method for fighting of wildfire based upon rapid and accurate visualization of a wildfire theatre including the steps of:
flying a lidar equipped aerial vehicle over the wildfire theatre;
gathering elevation data for the wildfire theatre through lidar data lathered by the lidar equipped vehicle;
matching the elevation data with associated coordinates for the wildfire theatre;
producing a digital elevation map of the wildfire theatre using the elevation data and the associated coordinates therefore;
displaying the digital elevation map as a depiction of terrain in the wildfire theatre;
adding wildfire data to the digital elevation map specifying at least location details for at least one wildfire within the wildfire theatre; and
annotating the digital elevation map with a dispatchable resource mark, the mark visible upon the digital elevation map after annotation, the mark correlated with a particular firefighting resource.

16. The method of claim 15 including the further steps of:
placing the mark as a vector including an origin at a tail of the vector and a heading extending away from the origin of the vector; and
dispatching a firefighting resource to the origin of the vector at a heading of the vector for application of firefighting agent along the vector within the wildfire theatre.

17. The method of claim 15 including the further step of imaging the applied firefighting agent by including an ultraviolet imageable element within the firefighting agent and gathering ultraviolet luminescence data within the wildfire theatre and correlating areas of ultraviolet luminescence with associated coordinates within the digital elevation map to provide a visual indication of where firefighting agent has actually been applied within the digital elevation map.

18. The method of claim 17 including the further step of repeating said annotating step with applied firefighting agent data displayed on the digital elevation map to continue firefighting activity with further dispatchable firefighting resources, taking into account where previous firefighting agents have been applied.

19. A method for fighting of wildfire based upon rapid and accurate visualization of a wildfire theater, including the steps of:
flying a lidar equipped aerial vehicle over the wildfire theatre;
gathering lidar data for at least a portion of the wildfire theatre through lidar data gathered by the lidar equipped vehicle;
analyzing the lidar data to determine density of combustible fuels at multiple locations within the wildfire theatre;
adding a visual depiction of fuel density to a map of the wild fire theater;
said analyzing step including detecting multiple returns for a laser pulse from the lidar equipped aerial vehicle and comparing the intensity of the multiple returns for the laser pulse to each other, and correlating a multiple return signature to fuel density; and
displaying the map of the wildfire theatre with fuel density at various locations in the wild fire theater depicted on the map.

20. The method of claim 19 wherein the lidar data includes elevation data and said displaying step includes displaying elevation data at least partially taken from the lidar data within the map of the wildfire theatre.

21. A method for fighting of wildfire based upon rapid and accurate visualization of a wildfire theatre including the steps of:
flying a lidar equipped aerial vehicle over the wildfire theatre;
gathering data for the wildfire theatre through lidar data gathered by the lidar equipped vehicle;
matching the data with associated coordinates for the wildfire theatre;
producing a map of the wildfire theatre at least partially using the data and the associated coordinates therefore;
displaying the map as a depiction of terrain in the wildfire theatre;
adding wildfire data to the map specifying at least location details for at least one wildfire within the wildfire theatre; and
wherein said adding wildfire data step includes adding active fronts of a wildfire area upon the map of the wildfire theatre.

22. The method of claim 21 wherein the lidar data includes elevation data and said displaying step includes displaying elevation data at least partially taken from the lidar data within the map of the wildfire theatre.

23. A method for fighting of wildfire based upon rapid and accurate visualization of a wildfire theatre including the steps of:
flying a lidar equipped aerial vehicle over the wildfire theatre;
gathering data for the wildfire theatre through lidar data gathered by the lidar equipped vehicle;
matching the data with associated coordinates for the wildfire theatre;
producing a map of the wildfire theatre using the data and the associated coordinates therefore;
displaying the map as a depiction of terrain in the wildfire theatre;
adding wildfire data to the map specifying at least location details for at least one wildfire within the wildfire theatre; and
annotating the map with a dispatchable resource mark, the mark visible upon the map after annotation, the mark correlated with a particular firefighting resource.

24. The method of claim 23 wherein the lidar data includes elevation data and said displaying step includes displaying elevation data at least partially taken from the lidar data within the map of the wildfire theatre.

25. The method of claim 23 including the further steps of placing the mark as a vector including an origin at a tail of the vector and a heading extending away from the origin of the vector; and
dispatching a firefighting resource to the origin of the vector at a heading of the vector for application of firefighting agent along the vector within the wildfire theatre.

26. The method of claim 23 including the further step of imaging the applied firefighting agent by including an ultraviolet imageable element within the firefighting agent and gathering ultraviolet luminescence data within the wildfire theatre and correlating areas of ultraviolet luminescence with associated coordinates within the digital elevation map to provide a visual indication of where firefighting agent has actually been applied within the digital elevation map.

* * * * *